(12) United States Patent
Haumont et al.

(10) Patent No.: US 7,027,800 B2
(45) Date of Patent: Apr. 11, 2006

(54) METHOD AND SYSTEM OF PROVIDING A SERVICE TO A SUBSCRIBER

(75) Inventors: Serge Haumont, Espoo (FI); Hannu Kari, Espoo (FI); Mikko Kanerva, Espoo (FI)

(73) Assignee: Nokia Corporation, Espoo (FI)

( * ) Notice: Subject to any disclaimer, the term of this patent is extended or adjusted under 35 U.S.C. 154(b) by 629 days.

(21) Appl. No.: 09/748,505

(22) Filed: Dec. 26, 2000

(65) Prior Publication Data

US 2002/0155825 A1 Oct. 24, 2002

Related U.S. Application Data

(63) Continuation of application No. PCT/EP98/04132, filed on Jun. 29, 1998.

(51) Int. Cl.
 *H04Q 7/20* (2006.01)
 *H04Q 7/32* (2006.01)
(52) U.S. Cl. .............. 455/412.01; 455/456.1; 455/456.3; 455/456.6; 455/456.2; 455/414.1; 455/414.2; 455/422.1; 705/14
(58) Field of Classification Search ......... 455/414.1, 455/456.1, 456.2, 456.3, 456.6, 456.5, 517, 455/404.1, 404.2, 422.1, 550, 403, 426.1, 455/426.2, 466, 500, 550.1, 556.1, 556.2, 455/456.4, 414.4; 370/66, 355, 395.2, 395.52; 709/203, 218, 219, 228, 229; 705/14; 379/100.08
See application file for complete search history.

(56) References Cited

U.S. PATENT DOCUMENTS

| | | | | |
|---|---|---|---|---|
| 5,555,446 A | * | 9/1996 | Jasinski | 455/414 |
| 5,579,535 A | * | 11/1996 | Orlen et al. | 455/414 |
| 5,905,777 A | * | 5/1999 | Foladare et al. | 455/414 |
| 6,049,711 A | * | 4/2000 | Ben-Yehezkel et al. | 455/414 |
| 6,141,558 A | * | 10/2000 | Chen | 455/404 |
| 6,310,889 B1 | * | 10/2001 | Parsons et al. | 370/466 |

FOREIGN PATENT DOCUMENTS

| | | |
|---|---|---|
| EP | 0 647 076 | 4/1995 |
| EP | 0 777 394 | 6/1997 |
| WO | 93/01665 | 1/1993 |
| WO | 98/21913 | 5/1998 |

* cited by examiner

*Primary Examiner*—Keith Ferguson
(74) *Attorney, Agent, or Firm*—Squire, Sanders & Dempsey LLP

(57) ABSTRACT

System and method for providing a service to a subscriber in a network. A specific network information of a mobile station (1) is provided to a service provider (5) which generates an individual service message on the basis of the provided network information. The provision of the network information may be dependent on a predetermined subscriber condition. Thus, the service message can be transmitted to predetermined subscribers without requiring the subscriber to generate and transmit the specific network information to the service provider (5).

27 Claims, 1 Drawing Sheet

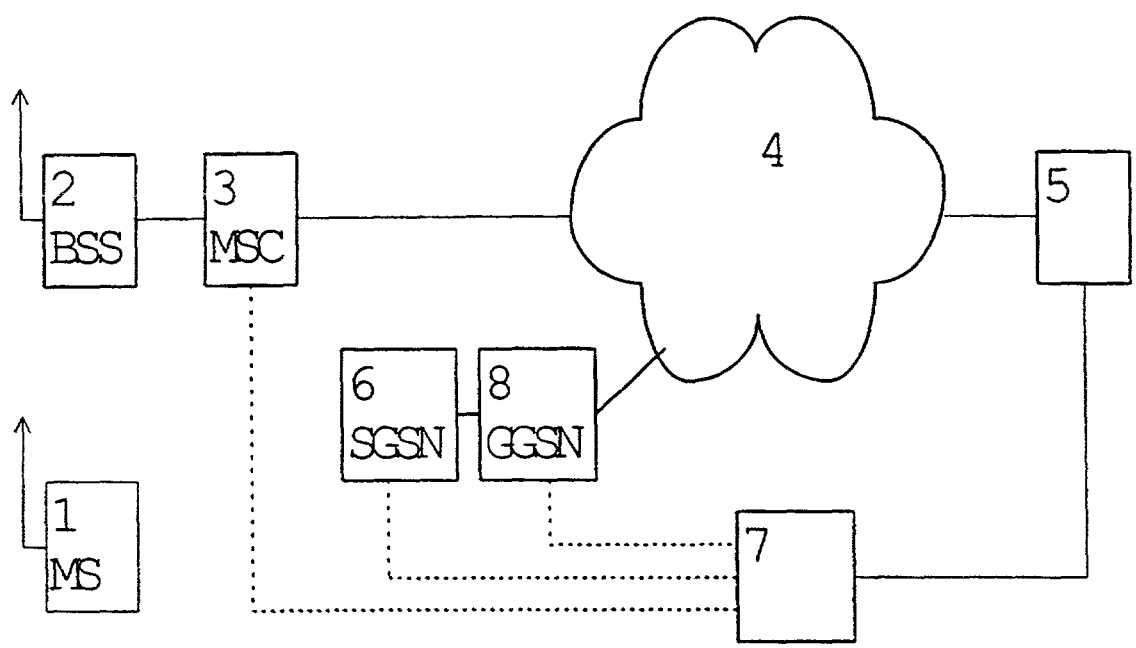

METHOD AND SYSTEM OF PROVIDING A SERVICE TO A SUBSCRIBER

This application is a continuation of international application Ser. No. PCT/EP98/04132, filed 29 Jun. 1998.

FIELD OF THE INVENTION

The present invention relates to a method and system for providing a service to a subscriber in a network, especially a cellular network like GSM (Global System for Mobile Communications) or a GPRS (General Packet Radio Services) network.

BACKGROUND OF THE INVENTION

There are cases where a service provider requires information about the location of the mobile station of a cellular network so as to provide a specific local service or push service. Such services could be an advertisement or a local map depending on the location of the mobile station.

So far, the service provider requiring the location of a mobile station had to rely on an information transmitted by the mobile station at an application level, if available. This information was usually based on a location measurement using for example a GPS (Global Positioning System).

Thus, the provision of a service related to the location of the mobile station was restricted to those cases where the mobile station is capable of providing the required location information.

SUMMARY OF THE INVENTION

It is an object of the present invention to provide a method and system for selectively providing a subscriber-specific service to a subscriber in a cellular network.

This object is achieved by a method for providing a service to a subscriber in a network, comprising the steps of providing a network information of the subscriber to a service provider; generating a service message on the basis of the provided network information; and transmitting the service message to the subscriber.

Furthermore, the above object is achieved by a system for providing a service to a subscriber in a network, comprising providing means for providing a network information of the subscriber to a service provider; and control means for controlling the provision of the network information to the service provider in dependence on a predetermined subscriber condition.

Preferably, the network information relates to an identity, a location, an address and/or an operating state of a mobile station of the subscriber in a cellular network. The location information may be derived from a data base for converting a cell identification of the mobile station into a location thereof.

The providing means may comprises a transmitting means for transmitting the network information of the subscriber to the service provider, wherein the control means controls the transmitting operation in dependence on the predetermined subscriber condition.

Alternatively, the providing means may comprise a storing means in which the network information of the subscriber is stored and which is accessible to the service provider, wherein the control means controls the storing operation in dependence on the predetermined subscriber condition. The provider of the external message may read the storing means by using a predetermined key relating to the subscriber, i.e. an IMSI or a PDP address.

The service message could be a local advertisement, a stock price change, or a header of an unread mail stored in a mail server, wherein the message is preferably transmitted when said mobile station is reachable according to the network information. Also, the service message could be any message (mail) stored in a server and delivered to the mobile station when an indication that the mobile station is reachable has been received.

The predetermined subscriber condition may be a request from the subscriber, wherein the network operator may receive the request which may include a service provider address, retrieve location coordinates of the subscriber on the basis of a cell identification, and transmit the location coordinates to the service provider using the received address. The request may be set by the mobile station or by the network operator.

The predetermined subscriber condition is relevant for a subscriber and can be set by the subscriber or the operator. It specifies which entity is allowed to access which subscriber information.

The network information of the subscriber can be transmitted in a header of a packet transmitted by the subscriber. The network information may further be inserted by a network element in a second packet which encapsulates the packet transmitted by the mobile station.

Other predetermined subscriber conditions may be a subscription parameter of the subscriber, an activation of a predetermined supplementary service, the location of the mobile station in a predetermined routing area or a cell, or the fact that the subscriber is located in its home area.

Accordingly, a subscriber-specific service message based on the provided network information of the subscriber can be transmitted by the service provider to any desired mobile station of the cellular network, since the mobile station is not required to generate and transmit a specific information relating to its location, identity or operating state. Since the provision of the individual network information can be controlled in dependence on a predetermined subscriber condition, the service can be restricted to selected ones of the subscribers.

BRIEF DESCRIPTION OF THE DRAWING

In the following, the invention will be described in greater detail on the basis of a preferred embodiment with reference to the accompanying drawing, which shows a system according to the present invention, wherein a GPRS network is connected via an IP or PSTN or ISDN network to a service provider.

DESCRIPTION OF THE PREFERRED EMBODIMENT

In the FIGURE, a system for providing an external message to a subscriber is shown, comprising a GPRS network having a mobile station MS 1 radio-connected to a base station subsystem BSS 2. The BSS 2 is connected via a mobile switching center MSC 3 to a network 4, which could be any network like a PSTN, ISDN or Internet, to which one or a plurality of service providers 5 is connected. Alternatively, the service provider 5 may as well be directly connected to network nodes (MSC 3, Serving GPRS Support Node SGSN 6, Gateway GPRS Support Node GGSN 8) of the GSM or GPRS network.

Furthermore, a providing means 7 used for externally providing a network information of the mobile station is connected to a network element (MSC 3, SGSN 6, GGSN 8). Additionally, the providing means 7 may be connected to the network 4. The providing means 7 can be accessed by the service provider 5 and can request information from a network element like the MSC 3, the SGSN 6 and/or the GGSN 8.

Alternatively, the providing means 7 may be a database type of equipment which is automatically updated by network elements. Moreover, the providing means 7 may be integrated in a network element.

Within a cellular network like the GSM or GPRS, information related to a mobile station of a subscriber are known. Such a network information may comprise an identity (e.g. International Mobile Subscriber Identity (IMSI) or Internet Protocol address (IP address)), a location information (e.g. cell or routing area) and an operating state indicating whether the mobile station reachable (e.g. Packet Data Protocol (PDP) context activated or not).

The GPRS network transmits the network information to the service provider 5 in dependence on a predetermined subscriber condition. The subscriber condition could be a context activation, a subscription parameter, the use of a given supplementary service, a cell identification indicating a certain routing area, the fact that the mobile station 1 is in its home area (HPLMN), or a specific request from the mobile station 1, or a combination of the above conditions.

According to a first example, the providing means 7 could be implemented as a part of the GGSN 8. In this case, the system operates as follows.

The service provider 5 informs the providing means 7 in the GGSN 8 that a message is waiting to be delivered to the MS 1. The providing means 7 stores the information that this service provider 5 (characterized by its service provider address) must be informed when the MS 1 becomes reachable. When the GGSN 8 detects that the MS 1 is reachable (PDP context activation or alert from Home Location Register HLR), the GGSN 8 informs the service provider 5 that this MS 1 is reachable.

According to a second example, the providing means 7 may be distributed. In this case, the MS 1 could include a means for determining the need of sending a specific network information (e.g. location) to the service provider 5. The SGSN 6 comprises a means for receiving a request from the MS 1, retrieving the network information needed, and forwarding the request and the relevant network information to a relevant means, i.e. the GGSN 8 (but it could also be the MS 1 or the service provider 5).

In case the mobile station 1 issues a request to provide a location information to the service provider 5, the service provider 5 is identified with its address, i.e. an IP address of the IP network 4. This request is transmitted to the SGSN 6 which then retrieves the network information of the MS 1 by means of the cell identification thereof. Typically, a data base could be provided for converting the cell identification of the MS 1 into geographical coordinates. Then, the location information and IMSI of the MS 1 and the address of the service provider 5 are forwarded by the SGSN 6 to the GGSN 8, i.e. providing means 7.

Subsequently, the GGSN 8 transmits the location information and the IMSI of the mobile station 1 via the network 4 to the service provider 5 by using the service provider address. Thus, the service provider 5 may generate the corresponding individual service message and transmit it to the identified MS 1 by using the corresponding IMSI address thereof.

As an alternative, the SGSN 6 could send the network information to the MS 1 (after a request from the MS 1), such that the network information of the MS 1 could be included in every packet transmitted by the MS 1. The location information could be added, for example, to a Ipv6 header of the mobile station packets.

Another option could be a "tunnel" between the GGSN and the service provider 5, so that each packet is encapsulated in a second packet and the network information (e.g. IMSI and location) is transmitted by the GGSN in the header of the second packet.

According to a third example, the providing means 7 may comprise a data base in which a certain network information of the MS 1 is stored, if one or a combination of the above defined predetermined subscriber conditions is fulfilled. A corresponding predetermined service provider 5 may obtain an allowance to access the data base.

If the predetermined subscriber condition is fulfilled, e.g. the MS 1 is in its home area, the SGSN 6 will store a certain network information of the MS 1, i.e. location, PDP address used, IMSI, reachability, in the database.

Accordingly, the service provider 5 may access the data base by typically using the PDP address of the MS 1 as a key (or the IMSI), so as to obtain the desired information about the MS 1 and to generate and transmit the individual service message to the MS 1.

In summary, a system and method for providing a service to a subscriber in a cellular network is described. A specific network information of a mobile station is provided to a service provider which generates an individual service message on the basis of the provided network information. The provision of the network information may be dependent on a predetermined subscriber condition. Thus, the service message can be transmitted to predetermined subscribers without requiring the subscriber to generate and transmit the specific network information to the service provider.

It should be understood that the above description and the accompanying FIGURE are only intended to illustrate the present invention. Thus, the method and system according to the invention may also be used in systems other than the described GPRS system. The preferred embodiment of the invention may vary within the scope of the attached claims.

The invention claimed is:

1. A method for providing a service to a subscriber in a network, comprising the steps of:
   providing a network related information which is related to said subscriber;
   generating a service message on the basis of said provided network related information; and
   transmitting said service message to said subscriber, wherein
   said network related information is provided for a service provider;
   said service message is a message generated by said service provider;
   said service message is transmitted to all those subscribers for which the same network related information is provided to the service provider; and
   the network related information of the subscriber is transmitted in a header of a packet transmitted by the mobile station of the subscriber.

2. A method according to claim 1, wherein
   said network related information relates to at least one of an identity, a location, an address, and an operating state of a mobile station of the subscriber in a cellular network.

3. A method according to claim 2, wherein said service message is transmitted when said mobile station is reachable according to the network related information.

4. A method according to claim 2, wherein the network related information of the subscriber is transmitted by a network operator to the provider of the message in dependence on a predetermined subscriber condition.

5. A method according to claim 4, wherein said predetermined subscriber condition is a request from the subscriber.

6. A method according to claim 5, wherein said request is set by the mobile station.

7. A method according to claim 5, wherein said request is set by a network operator.

8. A method according to claim 5, wherein a network operator receives the request including a service provider address, retrieves location coordinates of the subscriber on the basis of a cell identification, and transmits the location coordinates to the service provider using the received address.

9. A method according to claim 4, wherein
said predetermined subscriber condition is a subscription parameter of the subscriber.

10. A method according to claim 4, wherein
said predetermined subscriber condition is an activation of a predetermined supplementary service.

11. A method according to claim 4, wherein
said predetermined subscriber condition is the fact that the subscriber is located in his home area.

12. A method according to claim 1, wherein said service message is a local advertisement.

13. A method according to claim 1, wherein said service message is a header of an unread mail stored in a mail server.

14. A method according to claim 1, wherein said service message is a stock price change.

15. A method according to claim 1, wherein
the network related information is inserted by a network element in a second packet which encapsulates the packet transmitted by the mobile station.

16. A method according to claim 1, wherein the network related information of the subscriber is stored in a storing means in dependence on a predetermined subscriber condition, and wherein said storage means is accessible to the service provider.

17. A method according to claim 16, wherein
the service provider reads the storing means by using a predetermined key relating to the subscriber.

18. A method according to claim 16, wherein said predetermined subscriber condition is a request from the subscriber.

19. A system for providing a service to a subscriber in a network, comprising:
providing means for providing a network related information which is related to said subscriber; and
control means for controlling the provision of said network related information in dependence on a predetermined subscriber condition, wherein
said providing means is arranged to provide said network related information for a service provider connected to said network; and
said service provider is arranged to generate a message on the basis of said network related information, said message being transmitted to said subscribers, wherein
said service message is transmitted to all those subscribers for which the same network related information is provided to the service provider; and
the network related information of the subscriber is transmitted in a header of a racket transmitted by the mobile station of the subscriber.

20. A system according to claim 19, wherein the network related information relates to at least one of an identity, a location and an operating state of a mobile station of the subscriber in a cellular network.

21. A system according to claim 20, comprising
a database for converting a cell identification of the mobile station into a location thereof.

22. A system according to claim 19, wherein
the providing means comprises a transmitting means for transmitting the network related information of the subscriber to the service provider, wherein the control means controls the transmitting operation in dependence on the predetermined subscriber condition.

23. A system according to claim 19, wherein
the providing means comprises a storing means in which the network related information of the subscriber is stored and which is accessible to the service provider, wherein the control means controls the storing operation in dependence on the predetermined subscriber condition.

24. A system according to claim 19, wherein
said predetermined subscriber condition is a request from the subscriber.

25. A system according to claim 19, wherein
said predetermined subscriber condition is a subscription parameter of the subscriber.

26. A system according to claim 19, wherein
said predetermined subscriber condition is an activation of a predetermined supplementary service.

27. A system according to claim 19, wherein
said predetermined subscriber condition is the fact that the subscriber is located in his home area.

* * * * *